United States Patent [19]

Greskovich et al.

[11] Patent Number: 4,596,198
[45] Date of Patent: Jun. 24, 1986

[54] SLAG REDUCTION IN COAL-FIRED FURNACES USING OXYGEN ENRICHMENT

[75] Inventors: Eugene J. Greskovich, Allentown; Walter A. Zanchuk, Palmerton, both of Pa.

[73] Assignee: Air Products and Chemicals, Inc., Allentown, Pa.

[21] Appl. No.: 695,583

[22] Filed: Jan. 28, 1985

Related U.S. Application Data

[63] Continuation-in-part of Ser. No. 495,868, May 18, 1983, Pat. No. 4,495,874.

[51] Int. Cl.$^4$ .............................. F23D 1/00
[52] U.S. Cl. .................... 110/347; 110/261; 110/263; 110/265; 110/342; 122/22
[58] Field of Search .............................. 110/260-265, 110/341, 342, 347, 348; 122/22, 211, 479 R; 431/4, 10; 48/210

[56] References Cited

U.S. PATENT DOCUMENTS

| | | | |
|---|---|---|---|
| 2,865,344 | 12/1958 | Firl et al. | 122/478 |
| 3,250,236 | 5/1966 | Zelinski | 110/26 |
| 3,628,332 | 12/1971 | Kelmar . | |
| 3,699,903 | 10/1972 | King | 110/34 |
| 4,052,138 | 10/1977 | Gieck | 431/4 |
| 4,253,403 | 3/1981 | Vatsky | 110/260 X |
| 4,261,167 | 4/1981 | Paull et al. | 60/39.02 |
| 4,263,856 | 4/1981 | Rickard | 110/261 |
| 4,329,932 | 5/1982 | Takahashi et al. | 110/347 |
| 4,367,686 | 1/1983 | Adrian | 110/263 X |
| 4,495,874 | 1/1985 | Greskovich et al. | 110/342 X |
| 4,501,206 | 2/1985 | Leikert | 110/261 X |
| 4,515,094 | 5/1985 | Azuhata et al. | 110/262 X |
| 4,531,461 | 7/1985 | Sayler et al. | 110/261 X |

OTHER PUBLICATIONS

Ghosh et al; Igniting Pulverized Coal, 47, 117-121 (1955).
Ivernel, The Effect of $O_2$-Enrichment or of Preheating of the Oxidizer on Nitrogen Oxide, 1973, 463-468.
Ghosh et al, Studies of Pulverized Coal Flames, 595-601 (1957).
R. P. Weight, Letter-Initiation Temperature of Pulverized Fuel, 54, 176 (1981).
Bandyopadhyay et al, Prediction of Ignition Temperature of a Single Coal Particle.

*Primary Examiner*—Albert J. Makay
*Assistant Examiner*—Steven E. Warner
*Attorney, Agent, or Firm*—Michael Leach; James C. Simmons; E. Eugene Innis

[57] ABSTRACT

A method for combusting slagging coal in a furnace comprising a firebox and at least one injection nozzle having a bore for a primary airstream and an annular passage for a secondary airstream, the nozzle communicating with the firebox, which method comprises (a) injecting a primary airstream containing a pulverized coal and injecting a secondary airstream through the injection nozzle into the flame zone of the furnace firebox, the combined primary and secondary airstream composing the total air for combustion and combusting the coal to yield a flame of combustion, and (b) injecting a sufficient amount of oxygen into the primary airstream such that an oxygen enriched primary airstream emanates from the injection nozzle and the oxygen concentration of the total air for combustion is about 22 to 27 volume percent, whereby the amount of slag deposition is reduced.

22 Claims, 3 Drawing Figures

SLAG REDUCTION IN COAL-FIRED FURNACES USING OXYGEN ENRICHMENT

CROSS REFERENCE TO RELATED APPLICATIONS

This application is a continuation-in-part of U.S. application Ser. No. 495,868 filed May 18, 1983, now U.S. Pat. No. 4,495,874, which is incorporated by reference.

TECHNICAL FIELD

The invention relates to a process for the combustion of pulverized coal in a furnace firebox. More particularly, the invention relates to combusting pulverized coal which is fed into the furnace firebox with a primary airstream while a secondary airstream is also supplied into the firebox.

BACKGROUND OF THE INVENTION

It has been traditional to burn coal in the presence of excess air to generate heat that can be used directly or indirectly for the purpose of providing steam energy demands. This steam is subsequently used in industrial boilers to provide heat or in utility boilers to generate electricity. It is well known that the amount of excess air is carefully controlled, not only for combustion-zone purposes, but also to optimize the residence time and heat transfer in the convective zone of the furnace. Therefore, under these conditions, oxygen partial pressure is primarily maintained by controlling the excess air flow rate which at times can be beneficial in the combustion zone, but detrimental elsewhere in the furnace.

One type of furnace used for combusting pulverized coal comprises a furnace firebox having a primary air source and a secondary air source which provide at least a sufficient amount of air for the complete combustion of the coal. The pulverized coal is fed into the firebox suspended in the primary airstream. Typically, a nozzle having concentric cylindrical passageways is the means for injecting the primary and secondary airstreams. The primary airstream containing suspended pulverized coal is fed through the central passageway of the nozzle while the secondary airstream is injected through the surrounding, or annular, passageway.

Fireboxes are being fired with coals containing increasing ash contents due to their low price and the unavailability of low-ash coals. These high-ash coals, along with other low-ash coals which have a high tendency to slag, present a problem since large slag "chunks" can damage internals and slag buildup within the firebox requires frequent shutdowns. Slagging is the deposition on the internals of the furnace firebox of the mineral matter in the coal which has gone through a molten state during the combustion of the coal and adhered to a surface.

Attempts to solve this problem of slag deposition include cleaning coal to reduce the ash content. However, this method is very expensive since the coal must be ground extra fine to remove the ash. Also, various chemical additives can be used, either sprayed on the coal prior to combustion or injected into the combustion zone, to help reduce slagging.

U.S. Pat. No. 2,865,344 discloses adding oxygen to recycled combustion gases as a replacement for some of the air injected into the furnace in order to decrease stack heat losses and to better control furnace temperatures.

U.S. Pat. No. 3,250,236 discloses the combustion of pulverized fuel and is directed toward the production of large quantities of highly heated and high velocity products of combustion which are suitable for operating magnetohydrodynamic generators. A primary gas which typically is air and pulverized coal are mixed with preheated, oxygen-enriched secondary air to produce a homogeneous mixture before combustion. The mixing is accomplished in a particular mixing means in an injection nozzle.

U.S. Pat. No. 3,628,322 discloses delivering oxygen to a gas producer to gasify coal in order to produce fuel which is then delivered with more oxygen to a boiler furnace to generate steam.

U.S. Pat. No. 3,699,903 discloses a method in which oxygen is used alone, preferably in stoichiometric quantities, as the secondary or combustion gas, and with only enough primary air for fuel feed, adequate gas velocities, fuel turbulence and distribution in the furnace firebox.

U.S. Pat. No. 4,052,138 discloses a method of firing coal-powered boilers to produce heat to operate the boiler and also to produce a usable fuel gas. The method consists of burning pulverized coal in the presence of varying proportions of steam and oxygen. The boiler is over-fired with coal, but with an undersupply of oxygen, in order that the total available heat content of the coal is divided between heat released by the incomplete combustion of the coal and heat content contained in combustible flue gases.

U.S. Pat. No. 4,261,167 discloses gasifying a carbonaceous fuel at relatively high pressure and temperature by partial oxidation with oxygen to produce a fuel gas, the fuel gas from the partial oxidation reaction is expanded to a lower pressure in a turbine and, after removal of undesirable compounds, is supplied to a steam boiler for the production of power.

U.S. Pat. No. 4,329,932 discloses a method of burning fuel with lowered emission of nitrogen oxides which comprises feeding pulverized fuel to the main burner in a combustion furnace and additionally feeding pulverized fuel to the region of the furnace where the first fuel is about to conclude its combustion, using inert gas with or without a low oxygen content as a conveying fluid, while supplying oxygen or air to a region downstream of the region for fuel addition.

B. Ghosh, et al., Ind. Eng. Che., 47, 117–121 (1955) discuss the effect of oxygen enrichment on the ignition time of pulverized coal.

Other literature articles relating to oxygen enrichment of pulverized coal include:
A. Ivernel, Proc. Combustion Inst. European Symp. 1973, 463–468;
B. Ghosh, et al., 6th Symposium on Combustion, 595–601 (1957);
R. P. Weight, J. Inst. Energy, 54, 176 (1981); and
S. Bandyopadhyay, et al., Combustion and Flame, 18, 411–415 (1972).

SUMMARY OF THE INVENTION

The present invention relates to a method for combusting pulverized coal, particularly slagging pulverized bituminous coal, with oxygen enriched air in a furnace comprising a firebox and an injection nozzle having a bore for a primary airstream and an annular passage for a secondary airstream which provides for injection of the coal laden primary airstream and the secondary airstream in a non-premixed manner. The method for combusting slagging coal comprises (a) injecting a primary airstream containing a slagging, pulverized coal, which has a mean-mass particle diameter that results in slagging in the furnace, and a secondary airstream through the injection nozzle into the flame zone of the furnace firebox and combusting the coal to yield a flame of combustion, and (b) injecting a sufficient amount of oxygen into the primary airstream such that an oxygen enriched primary airstream emanates from the injection nozzle, the oxygen concentration of the total air for combustion in the flame zone being about 22 to 27 vol %, whereby the amount of slagging on the internal firebox walls is reduced.

In a preferred embodiment of the invention, about 2 to about 5 vol % oxygen enrichment is added to the combustion air injected into the firebox via the primary airstream, especially about 3 to 4 vol % oxygen enrichment. The primary airstream typically provides about 10 to 25 vol % of the total air for supporting combustion which is added to the firebox. Usually, only that amount of primary air necessary to carry the pulverized coal is used.

"Volume percent oxygen enrichment" means that volume percent (vol %) added to 21 vol %; for example, 1 vol % oxygen enrichment means that amount of oxygen addition which yields a total air for combustion having an oxygen content of 22 vol %.

Slagging is the accumulation of molten or "tacky" deposits on heat exchange surfaces in portions of the boiler exposed to radiant heat. It is the result of reactions occurring when the mineral matter is heated above some critical temperature, so that a liquid phase is produced in a portion of the material. ("Coal Fouling and Slagging Parameters", ASME Research Committee on Corrosion and Deposits from Combustion Gases, E. C. Winegartner, Ed. 1974).

In contrast to what a worker of ordinary skill in the art would expect based on prior art literature which indicates that oxygen enrichment would lead to higher flame temperatures and, therefore, yield a more "sticky" ash particle and consequently greater slagging, the method of the invention unexpectedly results in a reduction in slagging. It is believed that the oxygen enrichment in the primary air causes a more rapid burnout of the coal particle. If the coal particle is more rapidly burned in the flame, then a resulting ash particle while continuing in its path has a longer period in which to cool down, thus reducing the tendency to adhere to furnace internals.

DETAILED DESCRIPTION OF THE INVENTION

Figure 1:
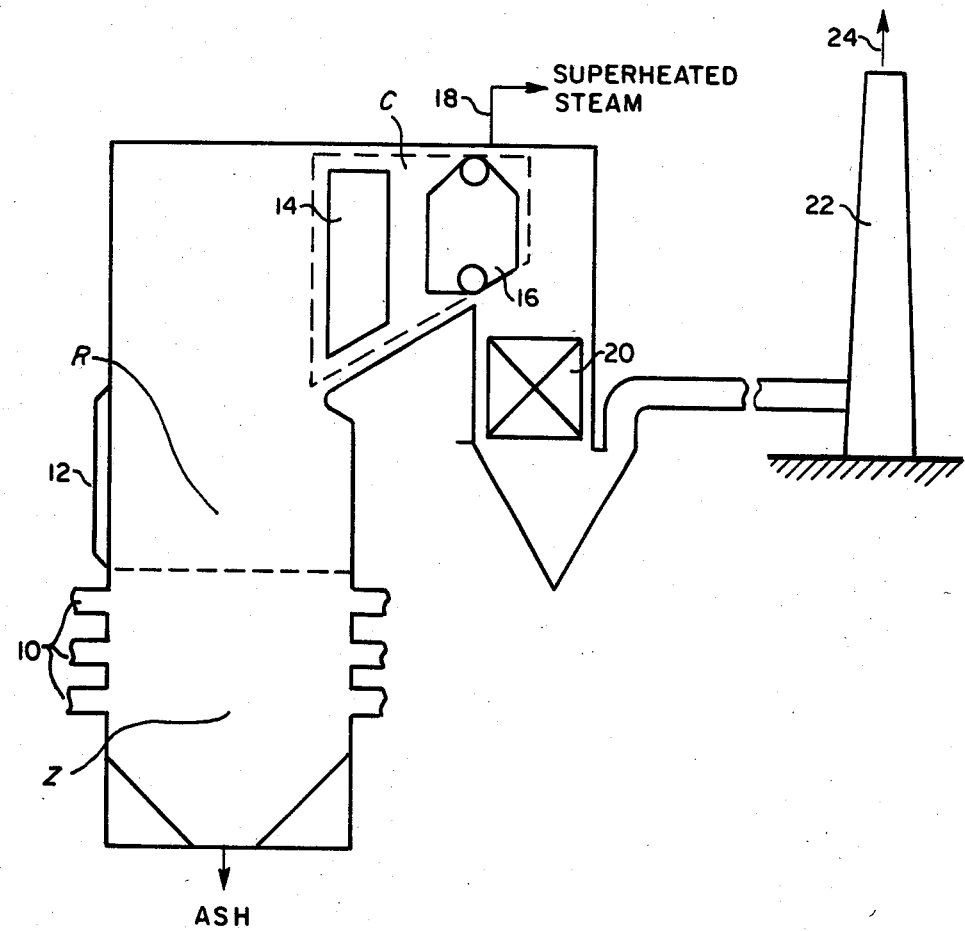
FIG. 1 is a schematic illustration of a conventional utility boiler or steam generator having a firebox section where fuel is combusted and overhead sections for radiant and convective heat transfer.
Figure 2:
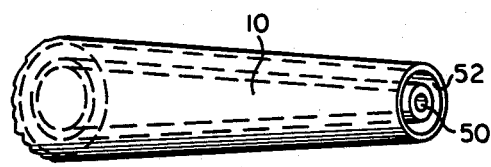
FIG. 2 is a drawing of a typical burner nozzle used to inject fuel and oxidant into the furnace of FIG. 1.

A typical utility boiler for generating steam is depicted in FIG. 1. Fuel such as pulverized coal is forced through one or more injection nozzles 10 into the furnace firebox combustion zone Z. The pulverized coal is "blown" through the nozzles with sufficient primary air to deliver the coal at a prescribed rate. Normally, additional air over and above this amount is necessary to maintain optimal combustion conditions. The secondary air source is generally added through the injection nozzle. As depicted in FIG. 2, the primary airstream normally conveys the fuel in cylindrical passage, or bore 50, of nozzle 10 while the secondary airstream by itself flows through the annular passage 52 surrounding passage 50. It is possible to add additional air to zone Z by other means for a variety of control purposes.

As shown in FIG. 1, fuel and air are combusted in combustion zone Z whereby radiant heat transfer occurs between the hot combustion gases and water flowing in vertical tubes, or water walls, 12 at the furnace wall around the firebox circumference in the general radiative region R. The tubes 12 are connected in the conventional manner to the tubes of boiler bank 14 and superheater 16 in which convective heat transfer between the hot combustion gases and water/steam takes place in the general convective region C to finally produce superheated steam 18 which is subsequently used in a turbine, not shown, to produce electrical energy. The spent combustion gases pass from convective heat transfer region C through economizer section 20 and ultimately through stack 22 to be discharged to the atmosphere at 24.

When the furnace is fired with slagging pulverized bituminous coal, i.e. pulverized coal having a mean-mass diameter that results in slagging when burned in the furnace, the coal in the primary airstream issuing from the tip of the burner nozzle is ignited and a stable flame established. At the end of the flame the coal particle is totally burned leaving a molten ash particle. When this particle strikes a surface, it can stick and after many such collisions, a buildup of slag occurs. Such slagging on the furnace walls and water tubes in the convective region of the furnace is indicative of the combustion of high ash content coals as well as low ash coals which are high-slagging. In addition to the down time losses in order to remove the slag buildup, there is a serious reduction in heat transfer rates.

According to the present invention, the fuel injected into a firebox combustion zone Z is pulverized bituminous coal which is slagging. The rate at which air is passed through the cylindrical bore 50 and annular passage 52 of nozzle 10 is adjusted to be in excess over that theoretically required for complete combustion of the coal. For example, if one pound per hour of pulverized coal were fed into the firebox combustion zone Z, the total air flow rate would be about 137 std. ft$^3$/hr proportioned 26.4 std. ft$^3$/hr as the primary airstream through bore 50 and 110.6 std. ft$^3$/hr as the secondary airstream through annular passage 52. This results in approximately 10% excess air. These values are obviously dependent on the type of coal and the size of the coal particles and combustor geometry.

An addition of about 1 to about 6 vol % oxygen enrichment, preferably of commercially pure oxygen, is made to the total air for combustion via the primary airstream so that the total air injected into the firebox combustion zone has an oxygen partial pressure of about 22 to 27 vol %. Oxygen enrichment below 1 vol % offers little, if any, benefit in slagging reduction. Above about 6 vol % oxygen enrichment slagging increases to the point where it is greater than that occurring in the absence of any oxygen addition, i.e. normal air. It is preferred to add sufficient oxygen to the primary airstream to afford about 23 to 26 vol % oxygen to the total combustion air, desirably about 25 vol % for maximum slag reduction. Where the primary airstream provides about 15 vol % of the total air injected via the nozzle into the firebox, the oxygen enrichment values for the total air can be achieved by using primary air having an oxygen partial pressure of about 28 to 62 vol %, 35 to 55 vol %, and about 48 vol %, respectively.

EXAMPLE

Pulverized Keystone bituminous coal having the properties listed in Table 1 was fired with and without oxygen-enriched primary and/or secondary air in a laboratory multiphase fuel combustion device. This combustor could be set up to essentially simulate the combustion environment in a utility boiler: residence time of about 1 second; peak gas temperatures of 1400°–1800° K.; heating rates of $10^4$°K./sec. The combustor was fired at about 0.05 to $0.5 \times 10^6$ Btu/hr with the pulverized Keystone coal which has a history of severely slagging in utility boilers. It had been established that the combustor's firing rate quite adequately yields combustion performance data that essentially simulate those that exist in full-scale utility boilers. The pulverized coal was conveyed with the primary airstream in bore 50 as noted in FIG. 2.

TABLE 1

| Proximate Analysis (dry, wt %) | | Ultimate Analysis (dry, wt %) | | High-Temperature Ash Analysis (wt % of total ash) | |
|---|---|---|---|---|---|
| Volatile Matter | 29.9 | Carbon | 69.1 | $SiO_2$ | 54.1 |
| Ash | 18.1 | Hydrogen | 4.3 | $Al_2O_3$ | 25.9 |
| Fixed Carbon | 51.9 | Nitrogen | 1.1 | $TiO_2$ | 1.3 |
| Moisture | 0.8 | Sulfur | 1.7 | $Fe_2O_3$ | 9.7 |
| | | Ash | 18.1 | MgO | 1.0 |
| | | Oxygen | 5.7 | CaO | 1.8 |
| | | | | $Na_2O$ | 0.3 |
| | | | | $K_2O$ | 2.9 |
| | | | | $P_2O_5$ | 0.4 |
| | | | | $SO_3$ | 1.1 |

The pulverized Keystone coal was fired in the laboratory combustion furnace at 4 lb/hr, at ±20% excess air, and at oxygen-enrichment to either the primary or secondary air. The primary air was 15% of the total air. The oxygen partial pressure of the primary air (15% of total combustion air) or the secondary air was increased from 21 vol % to various enriched levels. Neither of these streams was preheated. The mass-mean particle diameter was about 80 microns (46.9% minus 200 mesh).

Slagging was measured by inserting a water cooled, temperature-controlled (about 475±5° C.) mild steel probe before the exhaust section of the combustor.

The slag probe consisted of a 0.5" outer diameter steel tube outer shell with a 0.25" outer diameter insert for water cooling. The deposit tube was mounted vertically perpendicular to the flow of the slag/latent products of coal combustion near the exit of the combustor. With water circulating inside, the outside wall temperature of the probe could be held constant at about 475°–525° C. This thermal environment and configuration were believed to be somewhat representative of water wall tubes in a utility boiler.

The standardized ignition procedure comprised first heating the refractory-lined internal walls of the combustor to about 900° C. with a No. 2 oil/air flame. Once the combustor had reached a steady state condition, the oil flow was shut off and pulverized coal turned on. After the thermal profile of the combustor had re-equilibrated, the preweighed slag probe was inserted into the exhaust of the coal flame and exposed to the ash-ladened product stream for a period of one hour whereupon the fuel flow to the combustor was stopped and unit allowed to cool down. When the combustion chamber had returned to near ambient temperatures, the furnace was opened and the probe removed taking care not to lose any of the deposit that had adhered or accumulated. If any deposit did fall off, it was collected on a watch glass. The exposed probe and any fugitive ash were then weighed in order to determine the total weight of slag that had deposited per unit time. For each set of operating conditions, i.e., level of oxygen enrichment in either the primary or secondary air, the deposition test was repeated 3 times.

Figure 3:
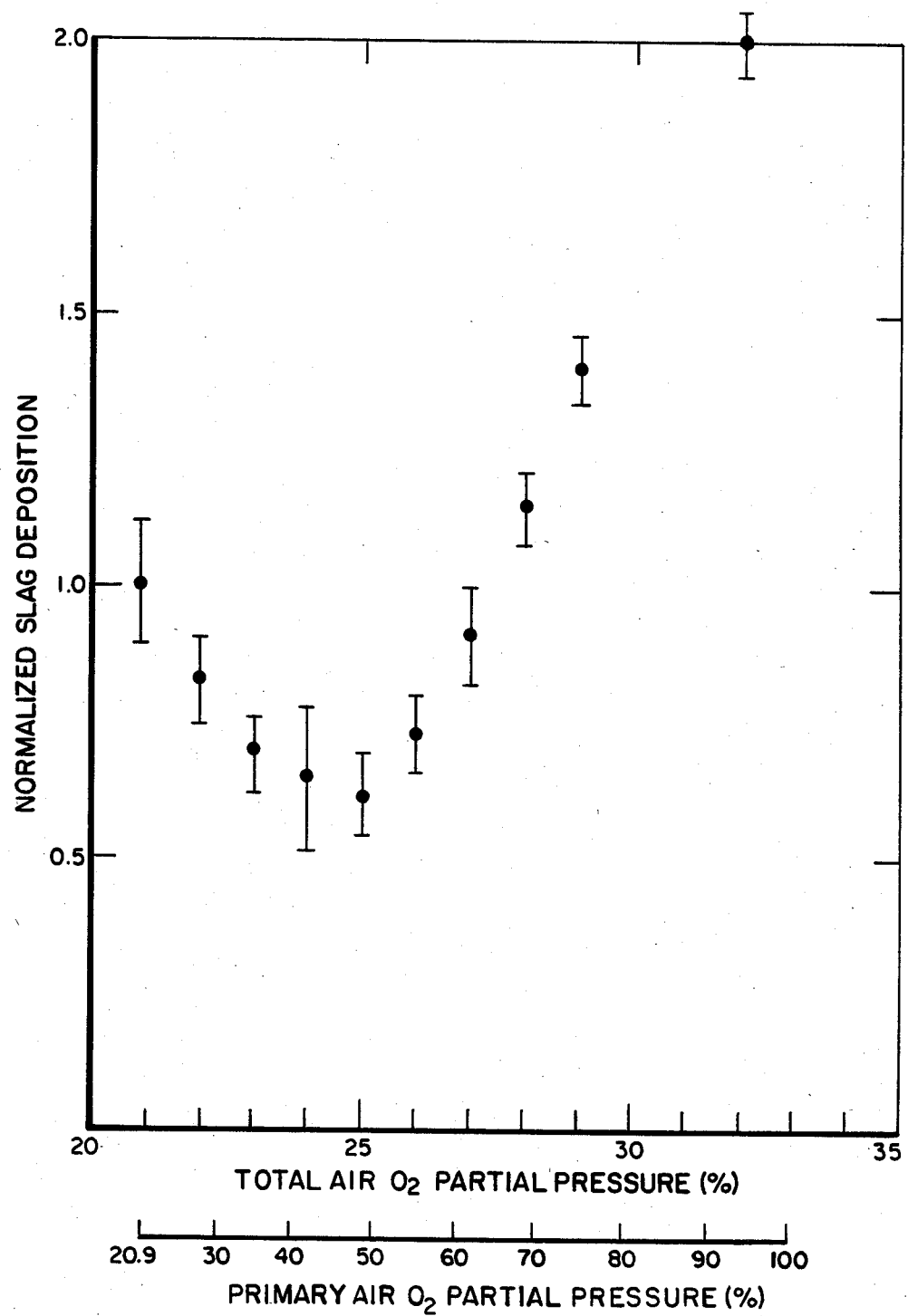
FIG. 3 graphically illustrates the reduction in slagging as a result of the oxygen enrichment according to the invention.

The results of the tests are presented in FIG. 3. As stated, the tests were conducted at 20% excess air and with the primary air (15% of total air) oxygen-enriched over increments from an oxygen partial pressure of 21–94%. This corresponded to an oxygen-enrichment of the total-air from 21–32%. For clarity of understanding, both the primary air and the total air oxygen-enrichment levels studied are plotted as the abscissa in FIG. 3. The average normalized deposition and its associated standard deviation for the three 1-hour experiments conducted at each particular level of enrichment are plotted. Deposit weights have been normalized to that determined in experiments conducted with normal air in the primary airstream (0% oxygen enrichment).

As can be seen from FIG. 3, a clear trend emerged regarding the effect of oxygen enrichment via the primary airstream on slag deposition. There was a measurable and reproducible reduction in slag deposition as the oxygen-partial pressure of the primary air was enriched from 22% to about 48%. The effect of oxygen enrichment on reducing slag deposition appeared to reverse itself at this point, i.e. at total air oxygen enrichment levels of greater than 4 vol %. In other words, further oxygen enrichment above this level resulted in increasing slag deposition. In fact, at oxygen enrichment levels in the total air of greater than about 6.5 vol %, the amount of slag deposited was greater than that for normal air.

Increasing the oxygen partial pressure of the secondary air from about 21 to 22.1 vol % (total air enrichment of 1 vol %) resulted in an increase in slag deposition based on visual observation. When the secondary air was further oxygen enriched, a further increase in slag deposition occurred. Hence, slagging experiments involving oxygen-enriched secondary air were ceased at this point. It had also been discovered in a separate experiment that a total oxygen enrichment of 2 vol % to a premixed pulverized Keystone coal/air flame substantially increased slag deposition by a factor of approximately 2. Independent tests in another combustor using oxygen enrichment of a premixed flame also increased slag deposition by a factor of approximately 4. (M. S. Thesis, W. P. Kinneman, Jr.; Penn State University, May 1983, "A Study of Slag Initiation Using Controlled Surface Temperature Probes in a 15 lb/hr Pulverized Coal Test Furnace").

In the past, whenever the effect of oxygen enrichment on slag deposition was considered, it was generally concluded that it would probably aggravate the problem. Simply, oxygen enrichment was thought to merely raise the "overall flame temperature". This effect would result in increased slag deposition because more of the mineral matter in the coal would go through a molten state and adhere to a wall as slag.

Oxygen enrichment, especially low enrichment levels, would have one possibly beneficial effect on slag deposition in that it would cause the coal particles' burn out time to be shortened due to the elevated temperature. This accelerated rate of combustion would tend to shorten the flame and move its exhaust away from the boiler wall. It was believed that this contraction of the fireball may decrease slag deposition because there would be lesser interaction between the immediate exhaust products of the flame and the wall. This effect was borne out in separate experiments by W. P. Kinneman, Jr. by the fact that the Keystone coal particle with a 65 micron mean-mass diameter burned out faster than an 80 micron particle and did not slag whereas the larger size particle did. However, workers in the art would probably conclude that the temperature rise affect of oxygen enrichment would dominate over the flame shortening effect, with the overall result that upon oxygen enrichment slag deposition would be equal to or more likely greater than that when normal air was used.

It is believed that the success of the present method of the invention in reducing slag deposition involves adding extra oxygen early in the flame to accelerate coal particle combustion and move the flame back from the wall and then cooling the resulting elevated flame temperature as quickly as possible thereafter. Thus the higher oxygen partial pressure in the primary combustion air accelerates coal particle ignition and burn out, and the overwhelming dilution effect (6:1) of the secondary air then cools the fireball down to temperatures at which the exiting slag would not be molten.

Accordingly, oxygen enrichment of the secondary air would result in increased slag deposition as demonstrated in the experiment. Although an increased oxygen partial pressure in the secondary air would facilitate coal partical burn out and move the flame away from the boiler-tube wall, it would also make the flame hotter late in its life time which would lead to either the continuation of the existence of molten slag issuing from the initial fire ball or the generation of molten slag at the tail end of the flame.

Thus, this critical positioning or timing effect of oxygen enrichment explains why a premixed coal/air flame burner yielded increased slag deposition during oxygen enrichment. In such premix coal/air flame burner any oxygen enrichment would distribute the extra oxygen over the entire plume of the flame. This "out of focus" type of enrichment would put extra oxygen late into the flame and would be expected to increase slag deposition.

As further evidence of the unobviousness of the method of the invention for reducing slag deposition, the reduction in Keystone coal mean-mass particle size from 80 to 65 microns resulting in the elimination of slag deposition upon its combustion is again considered with regard to the effect of this particle size reduction on the time and temperature history of the coal/air flame. For all practical purposes, the "temperature" of the pulverized coal flame will remain unchanged as particle size is reduced over this range. The burnout time roughly will be reduced by about the ratio of the particles' diameters squared, or by factor of 1.5.

Thus, the question to be asked is how much extra oxygen would be required to reduce the burnout time of an 80 micron partical by this factor.

Experiments by L. D. Timothy, et al, "Characteristics of Single Particle Coal Combustion," Nineteenth Symposium (International) on Combustion, pp. 1123-1130, The Combustion Institute (1983), on the characteristics of single partical combustion provide preliminary information with which to make this determination. With their model calculations, it can be estimated that a total air oxygen enrichment of approximately 11% (oxygen partial pressure of the total air from 21 to 32 vol %) would be required to reduce the burnout time of an 80 micron particle to that of a 65 micron sized particle.

For the experiments with the multiphase fuel combustor, this would require an enrichment of the primary air to about 100% oxygen in order to effectively reduce the burn-out time of the 80 micron coal particle to that of the 65 micron particle, and, therefore, possibly witness the complete elimination of slag deposition. Over the range of about 21 to 50 vol % oxygen partial pressure in the primary air, the decreasing slag deposition data set forth in FIG. 3 seemed to follow this trend in burn out time reduction for slag elimination. However, at a primary air oxygen partial pressure of about 50 vol % (total air oxygen enrichment of about 4 vol %), the trend reverses showing increasing slag deposition.

It is believed that, after the limiting primary air oxygen-partial pressure, continued increases in "flame temperature" caused by further primary air oxygen enrichment cannot be effectively cooled below some slag-limit temperature by the diluting effect of the secondary air. At this point, exiting slags, although farther away from any target or wall, will have a greater tendency to be molten longer and, therefore, are still able to travel and adhere to any target even if it is farther away.

STATEMENT OF INDUSTRIAL APPLICATION

The invention provides a method for decreasing the slag deposition in a coal-fired utility boiler combusting pulverized slagging coal.

We claim:

1. A method for combusting slagging coal in a furnace comprising a firebox and at least one injection nozzle having a bore for a primary airstream and an annular passage for a secondary airstream, the nozzle communicating with the firebox, which method comprises:

(a) injecting a primary airstream containing a pulverized coal and injecting a secondary airstream through the injection nozzle into the flame zone of the furnace firebox, the combined primary and secondary airstream composing the total air for combustion, and combusting the coal to yield a flame of combustion, and (b) injecting a sufficient amount of oxygen into the primary airstream via the injection nozzle such that an oxygen enriched primary airstream emanates from the injection nozzle and the oxygen concentration of the total air for combustion resulting from primary airstream enrichment is about 22 to 27 volume percent, whereby the amount of slag deposition is reduced.

2. The method of claim 1 in which the oxygen concentration of the total air for combustion is about 23 to 26 vol %.

3. The method of claim 1 in which the oxygen concentration of the total air for combustion is about 25 vol %.

4. The method of claim 1 in which 10–25 vol % of the total air for combustion is added via the primary airstream.

5. The method of claim 4 in which the oxygen partial pressure of the primary airstream is 28 to 62 vol %.

6. The method of claim 4 in which the oxygen partial pressure of the primary airstream is 35 to 55 vol %.

7. The method of claim 4 in which the oxygen partial pressure of the primary airstream is about 48 vol %.

8. The method of claim 1 in which about 15 vol % of the total air for combustion is added via the primary airstream.

9. The method of claim 8 in which the oxygen partial pressure of the primary airstream is 28 to 62 vol %.

10. The method of claim 8 in which the oxygen partial pressure of the primary airstream is 35 to 55 vol %.

11. The method of claim 8 in which the oxygen partial pressure of the primary airstream is about 48 vol %.

12. In a process for combusting pulverized coal in a furnace firebox which comprises feeding the pulverized coal into the firebox in a primary airstream and injecting a secondary airstream into the furnace firebox, the primary and secondary airstreams composing the air for combustion, and combusting the coal to yield a flame of combustion, the method for combusting pulverized coal having a mean-mass particle diameter that results in slagging in the furnace, which method comprises:
(a) feeding the pulverized coal into the furnace firebox in the primary airstream through the bore of an injection nozzle,
(b) injecting a secondary airstream into the furnace firebox through an annular passage around the bore of the injection nozzle, and
(c) adding a sufficient amount of oxygen to the primary airstream via the injection nozzle to afford an oxygen concentration of 22 to 27 volume percent in the total air for combustion.

13. The method of claim 12 in which the oxygen concentration of the total air for combustion is about 23 to 26 vol %.

14. The method of claim 12 in which the oxygen concentration of the total air for combustion is about 25 vol %.

15. The method of claim 12 in which 10–25 vol % of the total air for combustion is added via the primary airstream.

16. The method of claim 15 in which the oxygen partial pressure of the primary airstream is about 28 to 62 vol %.

17. The method of claim 15 in which the oxygen partial pressure of the primary airstream is about 35 to 55 vol %.

18. The method of claim 15 in which the oxygen partial pressure of the primary airstream is about 48 vol %.

19. The method of claim 12 in which about 15 vol % of the total air for combustion is added via the primary airstream.

20. The method of claim 19 in which the oxygen partial pressure of the primary airstream is about 28 to 62 vol %.

21. The method of claim 19 in which the oxygen partial pressure of the primary airstream is about 35 to 55 vol %.

22. The method of claim 19 in which the oxygen partial pressure of the primary airstream is about 48 vol %.

* * * * *